United States Patent [19]
Baclawski et al.

[11] 3,786,289
[45] Jan. 15, 1974

[54] ROTATING MACHINES HAVING END THRUST CUSHIONING ARRANGEMENTS

[75] Inventors: Joseph E. Baclawski; William R. Hunt, both of Fort Wayne, Ind.

[73] Assignee: General Electric Company, Fort Wayne, Ind.

[22] Filed: June 19, 1972

[21] Appl. No.: 264,196

[52] U.S. Cl. .................................. 310/90, 308/163
[51] Int. Cl. ...................... F16c 17/00, F16c 19/32
[58] Field of Search.. 308/161, 163, DIG. 7–DIG. 9; 310/90

[56] References Cited
UNITED STATES PATENTS

| 2,615,766 | 10/1952 | Wallace | 308/163 |
| 2,872,256 | 2/1959 | Thomson | 308/163 |
| 3,038,765 | 6/1962 | Tupper | 308/163 |
| 2,703,737 | 3/1955 | Turner | 308/163 |
| 2,471,180 | 5/1949 | Wightman | 308/161 |
| 2,600,353 | 6/1952 | Wightman | 308/163 |
| 2,912,290 | 11/1959 | Shaffer | 308/163 |
| 2,958,908 | 11/1960 | Thompson et al. | 18/59 |

*Primary Examiner*—J. D. Miller
*Assistant Examiner*—Robert J. Hickey

[57] ABSTRACT

Electric motor with stator and rotor assemblies and single member end thrust transmitting and cushioning system. The single member of each system limits rotor end play and is illustrated as an undulated disc or wavy washer. The thrust member includes first and second pluralities of spaced apart bearing surfaces or pads interconnected by ramps or beam elements. Angularly alternating ones of the pads lie in axially spaced apart parallel planes and are flexibly movable toward one another when compressed. Thrust member is formed of thermoresponsive (i.e., thermosetting or thermoplastic) material and juncture of ramps and pads promotes desirable lubricating action by lubricant flowing from reservoir, along sleeve bearing to stationary thrust bearing surface.

6 Claims, 6 Drawing Figures

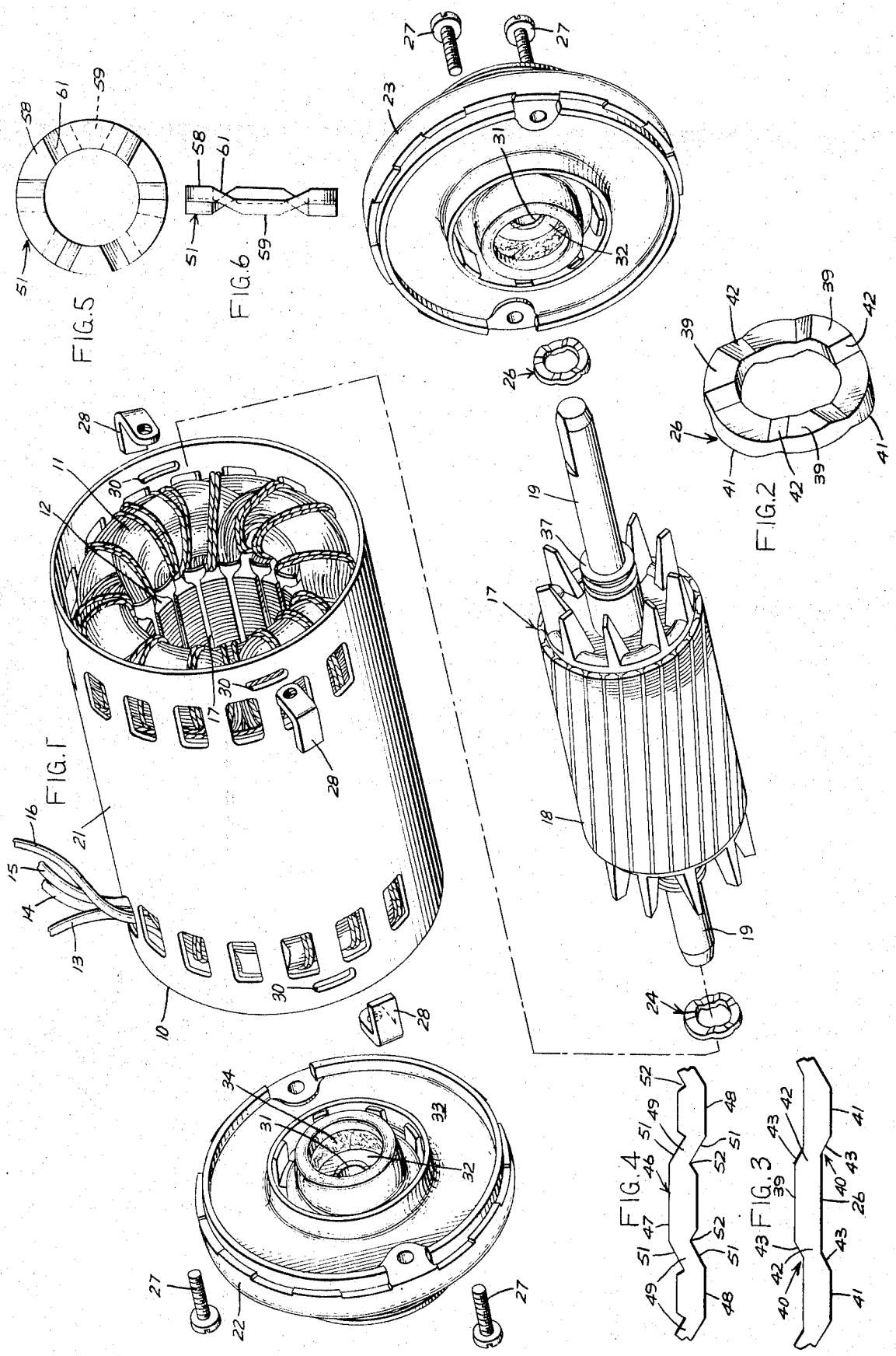

ROTATING MACHINES HAVING END THRUST CUSHIONING ARRANGEMENTS

BACKGROUND OF THE INVENTION

This invention relates to dynamoelectric machines, such as electric motors and other rotating electrical equipment and, more particularly, to machines having end thrust transmitting and cushioning means.

During operation of rotating electrical machinery axially directed forces are frequently transmitted to one or more bearing systems. Due to these forces, among other things, there is a tendency for the rotor or armature assembly to move in an axial direction along the axis thereof relative to the stationary part of the machinery. It has long been recognized that it would be desirable to limit the amount of such axial movement. Moreover, in many applications means preferably are provided that will limit such movement and also reduce or eliminate the axial vibration of the rotating assembly that is frequently referred to as "end bump."

For example, in the case of squirrel cage induction motors end bump, e.g., axial vibrations of the rotor assembly, may be set up with a fundamental frequency of twice the frequency of the applied voltage. Numerous arrangements have been proposed heretofore for reducing, if not entirely eliminating, the noise or buzz associated with the end bump phenomena in induction motors. These arrangements or systems have also usually included some means for transmitting axially directed thrust forces from a rotor assembly to a fixed thrust bearing surface. For example, Tupper U.S. Pat. No. 3,038,765 and Shaffer U.S. Pat. No. 2,984,528 (both assigned to the assignee of this application) are directed to two such arrangements. Still another commonly assigned patent that has recognized this problem as well as the problems associated with transferring heat from the thrust surfaces of the equipment is the Cunningham U.S. Pat. No. 3,235,317.

While the above and other approaches have, to greater or lesser degrees, been useful for solving the problems to which they were addressed, many thrust and cushioning arrangements have required the use of cushioning and thrust transmitting parts that have been of relatively complex design and shape, or that have been relatively expensive to manufacture and/or handle. In other arrangements, a plurality of parts have been used. In one particular motor, for example, a nylon thrust washer and a rubber-like cushion washer have been used in combination for carrying thrust loads and controlling end bump. In still other designs, a steel cup washer, a rubber-like cushion washer, and a low friction characteristic synthetic material thrust washer have been used.

Since each additional part in a thrust system represents a separate cost item for producing a motor, it will be understood that it would be extremely desirable to provide an improved system that would reduce the number of parts required in existing arrangements and thereby reduce one or more cost items without sacrifice in overall motor quality or expected useful life.

It would be particularly desirable to provide a new and improved arrangement wherein the presence of lubricant between cooperating thrust surfaces is encouraged so as to reduce both the friction and heat associated with the sliding contact between thrust surfaces and so as to promote, due to lubricant flow, the transferral of heat from the thrust surfaces in the system.

With many arrangements used heretofore, and particularly those utilizing rubber parts, it has been observed that the parts tend to swell when exposed to lubricants such as the light oils used for lubricating fractional horsepower induction motors. The loss of dimensional stability due to such swelling or due to other factors may adversely affect the performance and the useful life of a motor. Accordingly, it would also be desirable to provide a reliable arrangement wherein dimensional stability of the thrust transmitting and thrust cushioning means can be expected.

In many prior arrangements, and particularly in those where two or more different parts are utilized, at least some care has been needed when assembling the parts so that the parts were properly positioned or oriented relative to one another. Moreover, the parts used in some prior systems have been non-symmetrical. This has meant that they must be oriented in a particular manner relative to the end frame or stationary thrust bearing surface. Accordingly, it would also be desirable to provide improved thrust transmitting and cushioning means having a minimum number of parts and which may be assembled in a motor without regard to orientation of such parts relative to the motor thrust bearing surfaces.

It is, therefore, an object of the present invention to provide an improved and economical end thrust transmitting arrangement, involving a minimum number of parts, for rotating electrical machinery.

It is a further object of the invention to provide a motor having a one-piece end thrust transmitting and cushioning member which both cushions a rotor assembly and limits the axial end play of the rotor assembly while promoting the presence of a suitable lubricating film between contacting thrust bearing surfaces.

Another object of the present invention is to provide a thrust transmitting system that may be easily and economically assembled as part of a dynamoelectric machine without regard to orientation of the parts in the system and which will not detract from established desirable dynamoelectric machine characteristics.

SUMMARY OF THE INVENTION

In accordance with the invention, in one form thereof, we have provided an electric motor having a stator assembly, rotor assembly, and one or more single member end thrust transmitting and cushioning systems. In a preferred illustrated embodiment, a thrust bearing arrangement includes a stationary thrust bearing surface that is adjacent to or formed as a part of a sleeve bearing that rotatably supports the rotor assembly. The one-piece or single member also limits rotor end play and, in the preferred embodiment, is in the form of an undulated disc, or wavy or crested washer, having a first plurality of angularly spaced apart bearing surfaces each having at least a portion thereof disposed in a first plane, and a second plurality of angularly spaced apart bearing surfaces each having at least a portion thereof disposed in a second plane that is axially spaced from the first plane. Preferably, the bearing surfaces of the disc or washer are planar rather than curved.

Angularly adjacent but axially spaced apart ones of the bearing surfaces are interconnected by beam elements or ramps; and the oppositely facing bearing surfaces are resiliently movable toward one another in response to relative axial movement between the rotor and stator assemblies. Axially directed thrust forces are transmitted and cushioned by the thrust bearing system so as to substantially eliminate end bump. In a preferred form, the ramp and bearing surfaces of the single members establish part of a wedge-shaped cavity that is believed to contribute to an improved lubricating arrangement for the thrust surfaces. This in turn is believed to contribute to improved wearing characteristics and longer thrust system life.

Under relatively light axial loads, the end thrust is transmitted from the rotor assembly to the stationary thrust bearing surface by the one-piece thrust cushioning and end play limiting member. However, when a heavier thrust load is applied, the beam portions of the thrust member flex, and the spaced apart pads or thrust surfaces of the thrust member are moved axially toward one another.

The subject matter which we regard as our invention is set forth in the appended claims. The invention itself, however, along with further objects and advantages thereof will be better understood by referring to the following description taken in connection with the accompanying drawing.

BRIEF DESCRIPTION OF THE DRAWING

In the drawing:

FIG. 1 is an exploded view of a fractional horsepower induction motor embodying the invention;

FIG. 2 is an enlarged perspective view of a one-piece thrust cushioning and end play limiting member that is also illustrated in FIG. 1;

FIG. 3 is a developed or unrolled side view (with parts broken away) of the member shown in FIG. 2;

FIG. 4 is a view, similar to FIG. 3, but of a modified thrust cushioning and end play limiting member;

FIG. 5 is a plan view of the member shown in FIG. 4; and

FIG. 6 is a side elevation of the member shown in FIG. 5.

DESCRIPTION OF THE PREFERRED EMBODIMENT

Referring now to FIG. 1 of the drawing, a motor 10 that has been used to illustrate the invention in a preferred form has been illustrated as a fractional horsepower permanent split capacitor motor having windings 11 accommodated by a laminated stator core 12. As will be understood, the windings 11 in the motor 10 include first and second phase windings (e.g., primary and auxiliary windings), and lead wires 13–16 are utilized in practice to interconnect the windings with a suitable capacitor and source of energization voltage for the motor.

For purposes of completeness of disclosure, it is noted that the motor 10 is a 1/20th horsepower, 4 pole, 1,600 RPM motor designed for energization from a 115 volt, 60 HZ source of power and designed for operation with a 3.75 microfarad capacitor. The rotor receiving bore 17 was about 1½ inches, and the core stack height was about 2 inches.

The motor 10 also includes a rotor assembly 17 comprised of a short circuited squirrel cage rotor 18 and a shaft 19. On the other hand, the stator assembly of the motor 10 includes the stator core 12, windings 11, housing or shell 21, and end frame assemblies 22, 23. The thrust system of the motor includes one-piece thrust cushioning and end play limiting members 24, 26 that are slipped onto each end of the shaft 19 prior to positioning the rotor shaft in bearings carried by the end frame assemblies. The end frame assemblies 22, 23 are concentrically positioned at each end of the housing 21, and any suitable fastening means such as screws 27 and bracket nuts 28 (retained in housing slots 30) are used to secure assembly of the motor.

Although screw type fasteners have been illustrated, it will be understood that the parts of the motor may be secured together by any other suitable means. For example, the motor parts may be substantially permanently assembled together by means of a suitable structural adhesive material as taught in Thompson et al. U.S. Pat. No. 3,165,816, among others. On the other hand, the assembly may be accomplished by mechanically deforming tabs on the housing over end shield recesses as taught in the commonly assigned Feiertag U.S. Pat. No. 2,701,318.

The end frame assemblies 22, 23 each include a bearing that, for purpose of exemplification, are shown as sleeve-type bearings 31 having a conventional babbitt bearing surface. The bearing 31 is pressed into a bearing supporting member 32 that may be formed as part of an end frame or shield 33 as shown, or that may be a part separate from the end shield.

Each end shield also includes a lubricant reservoir which contains lubricant impregnated absorbent material such as felt 34 or another lubricant retaining material, such as grease or one of the extrudable lubricating materials that are more and more frequently used in dynamoelectric machines. Although not shown, a felt or other suitable material feed wick is utilized to supply lubricating material from the lubricant reservoir to the surfaces of the shaft 19 that are supported in each of the sleeve bearings 31. The end faces of the bearings 31 and bearing supports 32 form thrust bearing surfaces in the illustrated embodiment. In addition, shoulders 37 on the bar stock from which the shaft 19 is turned provide thrust surfaces for the rotor assembly 17.

During operation of motor 10, the rotor assembly 17 may tend to move axially (i.e., in a direction along the rotational axis of the shaft 19) relative to the stator assembly when different loads are applied thereto. Under relatively light axial loads, end bump vibrations are cushioned by the one-piece cushioning and end play limiting members 24, 26. These members also limit the amount of free end play or axial movement of the rotor assembly relative to the stator assembly as will be understood. The members 24, 26 are assembled with a slip-fit on the shaft 19 and are interposed between the rotor assembly thrust surfaces 37 and end shield and sleeve bearing thrust surfaces 31, 32.

It has been found from extensive testing of motors embodying the invention that such motors are extremely satisfactory from the standpoint of expected life. For example, it has been found that motors constructed generally like the motor 10 but incorporating a thrust member 26 at the pulley end (flatted shaft end) thereof and a two-piece previously known thrust system (comprising a flat nylon thrust washer and a rubber-type composition cushion washer) at the opposite end thereof, where successfully tested for 16,000 hours or more. These tests were run in a 40°C ambient room with the motors on for 25 minutes and off for 5 minutes in each successive 30 minute period.

During these tests, the shafts of the motors were horizontal and a 5 pound end thrust load was applied to each motor shaft. Ten motors, herein identified as "Lot A," were constructed as just described while five motors ("Lot B") were constructed with the prior two-piece thrust system at each end thereof. During these tests, a bearing seizure occured in one of the Lot B motors after 12,131 hours, and a bearing seizure occurred in one of the Lot A motors after 15,180 hours. All of the other motors, however, were still running after 16,550 hours, when the test was stopped. The test data for the motors completing this test indicated that the Lot A motors exhibited an average increase in end play of about 0.0339 of an inch While the average end play increase for the Lot B motors was about 0.0385 of an inch. It is believed that the results of this test show that motors embodying our invention are at least as good, if not better, than directly comparable previously known motors from a thrust system life expectancy viewpoint, notwithstanding the fact that fewer parts are used which are relatively economical to produce and handle.

It is believed that the satisfactory test results that have been obtained to date are at least partly due to what is believed to be a lubrication encouraging characteristic of the thrust cushioning and end play limiting members 24, 26. More specifically, it is believed that an oil wedging action is promoted between the bearing surfaces or pads 39 or 41 of the members 24, 26 and the stationary thrust bearing surfaces 31, 32. Furthermore, it is thought that this oil wedging action provides a hydrodynamic lubrication film between the bearing surfaces or pads of the members 24, 26 and the stationary thrust bearing surfaces; and that all of this contributes to a long service life for thrust systems embodying the teachings presented herein.

As will be understood from the following description, with light thrust loads, the rotor assembly 17 would be expected to move only a slight axial distance until the thrust bearing surface 37 at one end or the other of the rotor assembly just engages and pushes a thrust member 24 or 26 against a stationary thrust bearing surface or surfaces. However, with greater or increased axial thrust loads, the one-piece cushioning and end play limiting members 24, 26 will deform and resiliently accommodate the increased thrust loading.

The one-piece thrust cushioning and end play limiting members 24, 26 are substantially identical. Moreover, they are symmetrically formed so that they may be assembled on the shaft 19 without regard to which side of the member is in facing relationship with a rotor assembly thrust surface 37.

From a review of FIGS. 2 and 3, it will be appreciated that the thrust member 26 is, in effect, a wavy washer or undulated disc that includes a first plurality of angularly spaced apart bearing surfaces 39 on one side thereof, and a second plurality of angularly spaced apart bearing surfaces 41 on another side thereof. In the form illustrated in FIGS. 2 and 3, the bearing surfaces or pads 39, 41 are generally planar and the plane containing the surfaces 39 is parallel to and axially spaced from the plane containing the surfaces 41. However, it will be understood that the surfaces 39 and 41 could, if desired, be non-planar although it is believed that flat surface regions would soon be formed on each of the pads due to wear. This would be particularly true when the thrust members are formed from relatively soft but low friction synthetic materials such as nylon or other selected thermoplastic or thermosetting materials.

The structures 24, 26 were molded from NYLATRON material, a well-known material that is commercially available from the Polymer Corporation. However, other materials having suitable wear characteristics may also be selected for use, and it is not to be implied that materials such as a graphite-impregnated nylon is the only material suitable. For example, oil impregnated nylon or phenolic parts, having sufficient flexibility for the purposes herein described, would also be useful.

The bearing surfaces or pads 39, 41 are interconnected by sections 42 that form ramps or beam elements and, upon increased axial loading, the thrust elements may flex or become deformed. With this flexing action, the planes defined by the bearing portions of the surfaces 39, 41 become spaced more closely together. Then, upon removal of the increased thrust loads, the members 24, 26 reassume their original shape and the original spacing between the bearing portions of the surfaces 39, 41 is re-established, provided that cold flow of the thrust member material has not taken place. However, even when cold flow does take place and the elements 24, 26 take a permanent set, we have found that the thrust members 24, 26 continue to operate in a satisfactory manner as cushioning and end play limiting members.

It will be understood that the relative stiffness or springiness of the thrust members may be varied to meet any particular desired application by changing the materials utilized or by changing the geometric configuration of the thrust members.

For example, the beams or ramps 42 may be configured to interconnect the surfaces 39 and 41 so that a greater or lesser thrust force will be required to move the surfaces 39 and 41 toward one another a given amount. It is to be understood, however, that it is desirable for the surface 43 of the ramps 42 to intersect the surface 39 at at least some slight angle so as to define cavitation regions 40 and promote what is believed to be an oil wedging action and hydrodynamic lubrication film as described hereinabove.

With reference to FIG. 4, it will be appreciated that the thrust member 46 shown therein includes spaced apart pads or bearing surfaces 47 and 48 as well as ramps or beam sections 49. It also will be noted that the surfaces 51 of the ramps and beam sections intersect the surfaces 46 and 48 for the purpose of promoting the above-mentioned oil wedging action. In the structure shown in FIG. 4, notches or undercut regions 52 have been provided, and this is essentially the only difference between the structures shown in FIGS. 4 and 3. With this difference, it would be expected that a given amount of movement of the surfaces 46 and 48 toward one another occur upon the application of less axial thrust forces than would be needed for a corresponding amount of movement of the FIG. 3 structure.

Still another modification of a one-piece thrust cushioning and end play limiting member 55 is illustrated in FIGS. 5 and 6 wherein oppositely facing thrust surfaces 58 and 59 are interconnected by relatively thin beam sections or ramps 61. The ramps 61 are relatively thin and flexible as compared to the corresponding portion of the members shown in FIGS. 3 and 4. With the structure shown in FIGS. 5 and 6, a still smaller axial force would be expected to be needed to cause a given amount of axial displacement of the faces 58 and 59 toward one another as compared to the members shown in FIGS. 3 and 4.

The above discussion has been presented in connection with motors provided with a bearing at either end of the rotor assembly and a thrust member at either end thereof. However, It will be understood that in some applications it may be desired to provide a one-piece thrust cushioning and end play limiting member as taught herein at one end only of a piece of rotating electrical equipment, while, at the other end of the rotor assembly, a thrust system may be eliminated entirely or may be made as taught heretofore. Moreover, it should be obvious that one-piece thrust cushioning and end play limiting members of the type disclosed herein may be used in the fabrication of motors that are known in the art as "unit" or single bearing motors.

It will be appreciated from the foregoing that we have described a new and improved thrust cushioning means that will cushion sudden axial movement of a rotor assembly and thus provide satisfactory performance during operation of a piece of rotating electrical equipment. Thus, we have shown and described thrust members in the form of a thrust cushion or end play limiting member that is to be positioned between the thrust transmitting means or surfaces of a rotatable assembly and the thrust resisting portion of a stator assembly. These thrust members can transmit thrust forces to the thrust resisting portion of stator assemblies as well as reduce the magnitude of end bump of the rotor assembly during operation. Moreover, while the illustrated thrust members are generally disc shaped and have oppositely facing axially and angularly displaced movable bearing surfaces interconnected by ramps or beams (at least until a permanent cold flow or a permanent set occurs), the members could be other than disc shaped.

Thus, it will be apparent that while in accordance with the Patent Statutes we have illustrated and described our invention in its presently preferred form, changes may be made in the structure and arrangements specifically disclosed herein without departing from the true spirit and scope of the invention. We therefore intend in the following claims to cover all such equivalent variations as fall within the invention.

We claim:

1. A dynamoelectric machine having a stator assembly, a rotor assembly including a shaft and end thrust transmitting means; said stator assembly including bearing means arranged to rotatably support the shaft for rotation relative to the stator; and thrust cushion means, interposed between the end thrust transmitting means and a thrust resisting portion of the stator assembly, for transmitting thrust forces from the rotor assembly to the thrust resisting portion of the stator assembly and for cushioning sudden axial movement of the rotor assembly; said thrust cushion means comprising a one-piece undulated synthetic member formed by the application of pressure thereto, said undulated member being arranged to flex in response to the transmission of thrust forces and being assembled with at least a slip-fit with at least a part of the rotor assembly and being held in a position to transmit thrust between the end thrust transmitting means and the thrust resisting portion of the stator assembly; said one-piece undulated member having intersecting surface portions that establish a plurality of spaced apart relatively planar bearing surface portions and a plurality of cavitation regions with at least one cavitation region adjacent to each of said bearing surface portions, with said cavitation regions promoting a film of lubricating material between the bearing surface portions of the thrust cushion and the thrust resisting portion of the stator assembly.

2. In a dynamoelectric machine having a stator assembly that includes bearing means, a rotor assembly including a shaft and thrust transmitting means with the shaft being supported by the bearing means for rotation about an axis thereof, and at least one thrust member interposed between the thrust transmitting means and a thrust resisting portion of the stator assembly, said thrust member comprising a synthetic material undulated disc having a plurality of angularly spaced apart bearing surfaces each having at least a portion thereof disposed in a first plane generally normal to the axis of the shaft, and a second plurality of angularly spaced apart bearing surfaces each having at least a portion thereof disposed in a second plane spaced axially along the shaft from the first plane, said undulated disc including a plurality of cavitation regions with at least one cavitation region adjacent to each of said bearing surfaces, said undulated disc being yieldable in response to the application of thrust forces thereto so as to resiliently accommodate changes in thrust loading.

3. The structure of claim 2 wherein angularly adjacent ones of the bearing surfaces are interconnected by a resiliently deformable ramp element.

4. A dynamoelectric machine having a rotor assembly and stator assembly with the rotor assembly supported for rotation relative to the stator assembly, said dynamoelectric machine further comprising a lubricant storage system, a synthetic material generally disc-shaped member having oppositely facing axially and angularly displaced relatively movable bearing surfaces; angularly adjacent ones of said oppositely facing bearing surfaces being interconnected by a beam element whereby said oppositely facing bearing surfaces may be resiliently urged axially toward one another in response to axial movement of the rotor relative to the stator so as to transmit axially directed forces to the stator assembly from the rotor assembly and so as to cushion the rotor assembly as movement of the rotor assembly axially relative to the stator assembly is arrested; said member including at least one cavitation region adjacent to each bearing surface for promoting a film of lubricating material along the bearing surfaces during operation of the dynamoelectric machine.

5. The structure of claim 4 wherein each beam element coacts with a stationary thrust surface to define a cavitation region and to establish a hydrodynamic oil film along the stationary thrust surface.

6. A thrust member for use in an electric motor having rotatable parts, said member comprising a deformable synthetic material cushion having a plurality of angularly spaced apart and oppositely facing bearing surfaces, angularly adjacent and oppositely facing ones of said bearing surfaces being joined together by ramp elements and resiliently movable toward one another upon the application of compressive forces thereto, said oppositely facing bearing surfaces being alternately located about a shaft accommodating aperture and establishing, with the ramp elements, a flexible and circumferentially undulated thrust transmitting structure; said oppositely facing bearing surfaces being faces of bearing pads, and angularly adjacent ones of the bearing pads being interconnected by a ramp element; said cushion including at least one cavitation region adjacent to each bearing pad for promoting lubrication of the pad faces within the electric motor.

* * * * *